`US009085933B1`

(12) United States Patent
Crittenden (10) Patent No.: US 9,085,933 B1
(45) Date of Patent: Jul. 21, 2015

(54) HOLLOW CORE DOOR WITH SCRUBBERS FOR CLEANING INNER AIR FLOW

(76) Inventor: Jerry G. Crittenden, Phoenix, AZ (US)

( * ) Notice: Subject to any disclaimer, the term of this patent is extended or adjusted under 35 U.S.C. 154(b) by 892 days.

(21) Appl. No.: 12/927,766

(22) Filed: Nov. 23, 2010

(51) Int. Cl.
*E06B 3/70* (2006.01)
*E06B 3/58* (2006.01)
*B29C 43/18* (2006.01)

(52) U.S. Cl.
CPC .............. *E06B 3/5892* (2013.01); *B29C 43/18* (2013.01); *E06B 3/7001* (2013.01)

(58) Field of Classification Search
CPC ...... E06B 3/5892; E06B 3/7001; B29C 43/18
USPC ................ 52/455–458, 783.1, 783.14, 784.1, 52/784.11, 784.14, 784.15, 787.1, 787.11, 52/790.1, 799.1, 799.11, 799.12, 799.13, 52/800.1, 745.19, 746.1, 232
See application file for complete search history.

(56) References Cited

U.S. PATENT DOCUMENTS

| | | | | |
|---|---|---|---|---|
| 1,107,369 | A * | 8/1914 | Shelton ........................ | 52/455 |
| 2,479,870 | A * | 8/1949 | Rundquist ..................... | 428/98 |
| 5,305,577 | A * | 4/1994 | Richards et al. ............ | 52/783.13 |
| 6,941,720 | B2 * | 9/2005 | DeFord et al. ............. | 52/783.14 |
| 2003/0005645 | A1 * | 1/2003 | Wang Chen .................... | 49/501 |
| 2003/0089061 | A1 * | 5/2003 | DeFord et al. ............... | 52/309.9 |
| 2006/0207199 | A1 * | 9/2006 | Darnell ......................... | 52/232 |
| 2007/0110979 | A1 * | 5/2007 | Clark et al. ................ | 428/292.1 |
| 2009/0038262 | A1 * | 2/2009 | Marschke .................. | 52/793.11 |
| 2009/0044471 | A1 * | 2/2009 | Harlin et al. ............... | 52/309.13 |

* cited by examiner

*Primary Examiner* — Beth Stephan
(74) *Attorney, Agent, or Firm* — H. Gordon Shields (57) ABSTRACT

A hollow core door filters air flowing through the interior of the door between top and bottom rails of a perimeter frame and may absorb and decompose noxious or and undesirable materials used in the manufacture of door components and undesirable material in the air in the room or structure in which the door is located. The scrubbing action is accomplished by use of filtering material secured to one or both the top and bottom panels secured to the perimeter frame and to interior core elements. Air flowing within the door passes over the filtering or scrubbing material and the noxious material and gases are removed from the flowing air by the scrubbing material. Each of several embodiments of internal structural elements and materials allows for the flowing of the air to be cleansed and for undesirable materials or compounds to be absorbed and decomposed. Additional embodiments include absorbent material in the substances out of which door panels are made to absorb noxious material, and absorbent material within the hollow core for absorbing noxious material from the door panels themselves without including air flow elements, and exterior and interior photocatalytic materials.

22 Claims, 5 Drawing Sheets

HOLLOW CORE DOOR WITH SCRUBBERS FOR CLEANING INNER AIR FLOW

BACKGROUND OF THE INVENTION

1. Field of the Invention

This invention pertains to doors, and, more particularly, to hollow core doors having scrubbers, or filtering material, in the hollow core of the door for improving the quality of the indoor air by removing noxious material and cleaning the air flowing through the door, and to a method of making such a door.

2. Description of the Prior Art

Hollow core doors have been made for many years for inside doors. The hollow core doors are less expensive than solid core doors, are easier to manufacture, and they are rigid and hence resist warping and twisting. Such hollow core doors make up the largest share of inside doors where strength and security are not required.

A hollow core door generally includes a perimeter frame of a pair of vertically extending stiles and a pair of horizontally extending rails. The perimeter frame is covered typically with plywood panels adhesively secured to the perimeter frame. There are also inside frame elements, typically wood strips extending horizontally between vertical frame members or in an "x" configuration within the perimeter frame.

With the advent of cheaper materials, such as hardboard and medium density fiberboard (mdf) to replace the plywood, the construction of doors became less expensive using the cheaper materials than the manufacture of doors using the more expensive plywood panels or covers. However, the use of hardboard and mdf also requires a binder, and the most commonly used binder is a urea formaldehyde resin or compound. In other words, the substances out of which panels for hollow core doors are made inherently include, under contemporary manufacturing processes, at least a single noxious material.

The use of urea formaldehyde contributes to what is sometimes referred to as "Sick Building Syndrome." This syndrome is caused by the gas emissions from the formaldehyde and from other chemicals used in the new door products and from other products in the home that also use formaldehyde resin or binder, such as furniture, kitchen cabinets, wood flooring, counter tops, wallpaper, carpet, and even paint.

There may also be other factors contributing to the Sick Building Syndrome, such as poor ventilation, combustion gases, fumes from attached garages, high auto traffic, tobacco smoke, and various volatile organic chemicals or VOCs. However, formaldehyde compounds or products probably contribute most to the Sick Building Syndrome and to the discomfort of people in the building or structure.

One solution, or partial solution, to the syndrome is to reduce the use of formaldehyde products. Another solution is to provide a product or products that absorbs and decomposes the formaldehyde gases and other noxious gases or products. The present invention includes absorbent material which absorbs and decomposes formaldehyde gases and other noxious materials and removes them from within the hollow core door and from air passing through the hollow core of a door to help clean the air within the room and building in which the door is located.

Moreover, the use of several doors in a house or building, such as one or more doors in each room, provides sufficient area on which is disposed the absorbent material for cleaning or scrubbing the air flowing through the doors. It is noted that typically each room in a house has at least one door, and rooms may have more than one door when closet doors, etc., are taken into consideration. The more doors in a home or building, the more efficient the scrubbing or cleaning process becomes.

It is also noted that in the case of new construction, doors are usually installed towards the end of the construction period, but prior to occupancy. It is important to clean the air of all the noxious material occasioned by the construction, such as paints, adhesives, smoking, new furniture, etc., prior to occupancy. The use of fans to change the air after construction and prior to occupancy may remove much of the noxious materials, but VOCs and adhesive gases may continue to outflow from their sources for a substantial period of time after construction and after occupancy. The present invention helps to remove those noxious materials from the air on a continuing, long term basis.

There are few, if any, doors in the prior art which have dealt with the problem of cleaning air. U.S. Pat. No. 1,107,369, patented Aug. 18, 1914, discloses a ventilated door having a rather complicated structure. It is not a hollow core door, but has a plurality of small passages through which air may move. The purpose of the door is to prevent warping and to prevent veneer from becoming detached by reason of climate changes. There is only a single small air aperture at the bottom of the door and a single small air aperture at the top of the door. The door includes veneer strips to help reduce the cost of the door and to improve the appearance of the door. Due to the structure of the door, there would be very little, if any, direct air flow through the door. It would probably be more nearly accurate to state that door structure permits air to be present within the door.

U.S. Pat. No. 1,275,549, patented Aug. 13, 1918, discloses a metal door having baffled openings through which air may flow through the door. On the opposite side of the door from the baffles there are panels for covering the openings in case of fire. The panels are normally open, but fusible links causes the panels to pivot downwardly by gravity when heat (fire) melts the fusible links.

U.S. Pat. No. 3,338,013, patented Aug. 29, 1967, discloses a ventilated door panel including hardboard skins, foam cores, cardboard honeycomb cores, etc., adhesively secured together. The panel includes perforations extending through the core of the panel. The perforations are connected by grooves. The purpose of the perforations and grooves is to provide air convection for curing adhesives used in the construction of the panel and for allowing trapped moisture to escape or evaporate.

U.S. Pat. No. 3,829,337, patented Aug. 13, 1974, discloses door construction including transverse interior frame members having openings extending through them for the purpose of saving weight.

There are a number of patents which include the use of various materials for the structural members of solid core fire resistant doors. The following three patents are examples illustrating solid core fire resistant door construction materials. Note that gypsum may be mixed with other materials as structural elements for fire resistant properties. There is no indication of using the gypsum as a decontaminating agent. Moreover, the gypsum is mixed with other elements and thus the contact with any air is negligible, at best. And finally, all of the fire resistant doors are solid core doors and accordingly there is no air flow through them.

U.S. Pat. No. 3,987,600, patented Oct. 26, 1976, discloses a fire resistant solid core door. The stiles and rails of the perimeter frame are made of fire resistant material with a fire-resistant core and facing skins of substantially monolithic sheets. The stiles and rails are made of fiberglass matting and a gypsum slurry impregnating the matting to provide a fire resistant frame for the core and the facings.

U.S. Pat. No. 4,075,804, patented Feb. 28, 1978, discloses another example fire resistant door construction. The door is asbestos free to minimize health hazards.

U.S. Pat. No. 6,648,965, patented Nov. 18, 2003, discloses another type of structural elements for a solid core fire resistant door. The materials used for the structural elements may include gypsum, expanded perlite, cement, and glass fibers.

U.S. Pat. No. 6,357,197, patented Mar. 19, 2002, discloses linear structural members for, among other uses, the construction of doors. The members comprise composite materials, including thermoplastic materials which may cover wood products.

U.S. Pat. No. 2,771,021, patented Nov. 20, 1956, discloses a door having a built in deodorizer. The '021 door is not a hollow core door, but rather is a stile and rail door with a bottom panel that includes an absorbent felt pad on one side of the bottom panel. The felt pad is saturated with a deodorizing or air modifying agent. As the door is opened and closed, the air moved by the door contacts the deodorizing agent and deodorizes the air. There are passages from one side of the bottom of the door extending to the bottom of the air modifying pad to aid in air flow.

Several examples of air modifying materials are given in the '021 patent. It is interesting to note that one of the materials is formaldehyde. Formaldehyde is cited for its ability to reduce the sensitivity of the olfactory nerve. However, formaldehyde is one of the noxious materials removed from the air by the present invention.

U.S. Pat. No. 65,451, patented Jun. 4, 1867, discloses a door having a passageway at the top of the door and a passageway at the bottom of the door through which a limited amount of air may flow between the front and the back of the door.

SUMMARY

The invention described and claimed herein includes material within a hollow core door that absorbs and decomposes formaldehyde and other noxious gases and moisture. The hollow core door includes a path from the bottom of the door to the top of the door so that air may flow vertically through the door by convection and subject the flowing air, with its contaminants, to the filtering effects of the absorption or decomposition material within the door. Several different embodiments of door construction are provided, and several different absorption products are disclosed. A method of making a door with the absorbing and decomposing and/or removing capabilities for helping to clean the air is also disclosed.

Among the objects of the present invention are the following:

To provide a new and useful hollow core door;

To provide a new and useful hollow core door having passages at the top and bottom of the door for the vertical flow of air through the door;

To provide a new and useful hollow core door having absorption materials within the hollow core;

To provide a new and useful hollow core door having materials within the hollow core for decomposing and removing noxious gases from air flowing through the core of the door;

To provide a new and useful hollow core door having materials within the door for absorbing and decomposing undesirable materials or compounds used in the manufacture of door components;

To provide a hollow core door having panels made of substances having both decomposing material and absorbent material for scrubbing the noxious material from the door;

To provide a new and useful hollow core door for filtering noxious material from air flowing through the door;

To provide a new and useful method of making a hollow core door;

To provide a new and useful method of making a hollow core door having openings within the door for the flow of air; and To provide a new and useful method of making a hollow core door having an absorbent material within the door for aiding in the cleaning or scrubbing of air flowing in the door.

To provide a new and useful door including photocatalytic materials for scrubbing noxious materials from air.

DESCRIPTION OF THE PREFERRED EMBODIMENT

Figure 1:
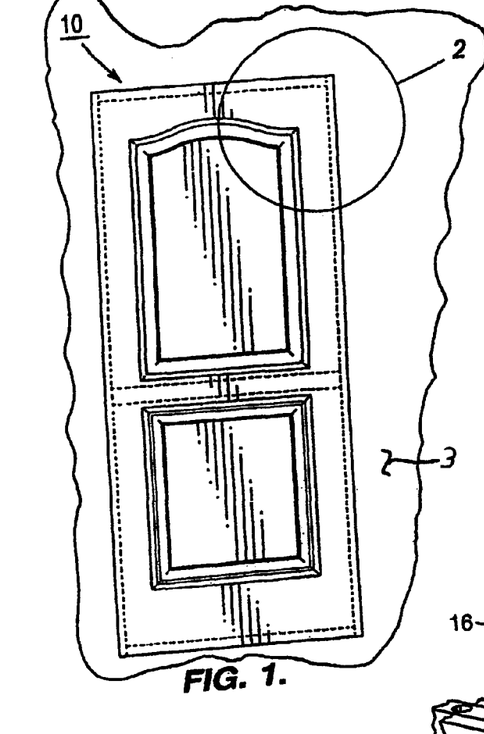
FIG. 1 is a schematic representation of a door of the present invention in its use environment.

FIG. 1 is a schematic representation or view of a hollow core door 10 of the present invention disposed within a room 2. The room 2 is the use environment of the door 10. The door 10 includes a top panel 12 secured to a perimeter frame.

Figure 2:
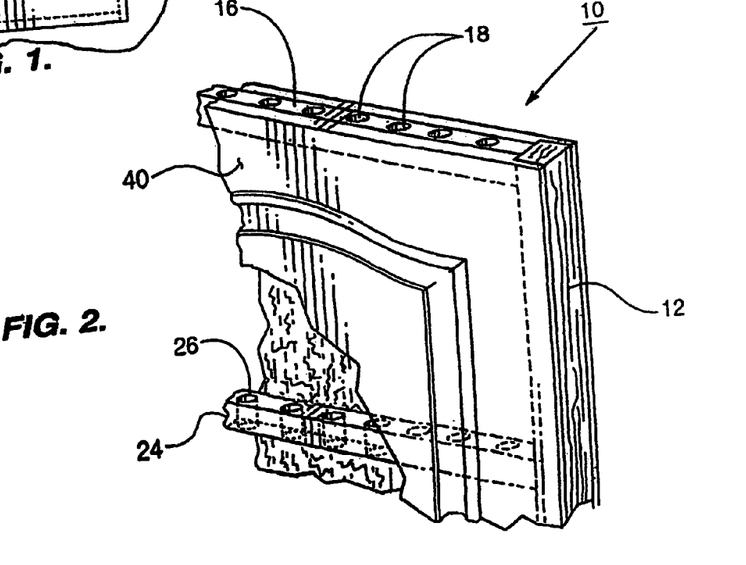
FIG. 2 is a perspective view of a portion of the door of FIG. 1 partially broken away, taken generally from circle 2 of FIG. 1.

Elements of the perimeter frame and portions of internal elements are shown in FIG. 2. FIG. 2 comprises a perspective view of a portion of the door 10 of FIG. 1, taken generally from circle 2 of FIG. 1. A portion of a side stile 12 is shown, along with a portion of a top rail 16, and a top cover or panel 40. The top rail 16 includes a plurality of openings or holes 18 through which air flows vertically within the door 10. Also shown in FIG. 2 is a portion of an upper internal brace element 24. The element 24 includes a plurality of spaced apart holes or openings 26 through which air may flow.

Figure 3:
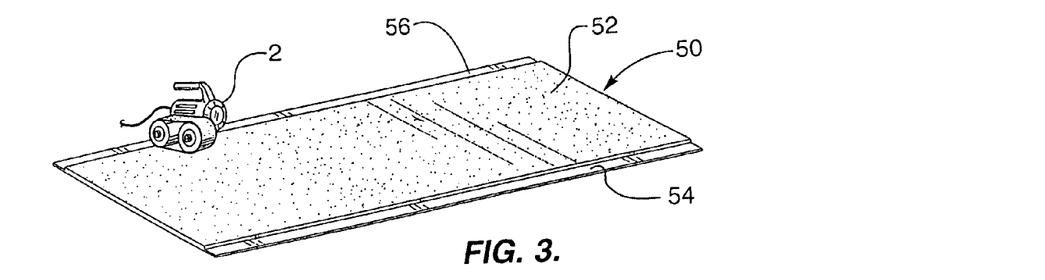
FIGS. 3, 4, and 5 are perspective views sequentially illustrating the manufacture of a door of the present invention.
Figure 4:
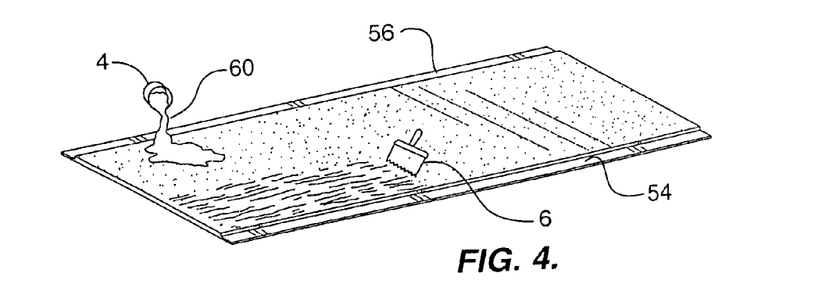
Figure 5:
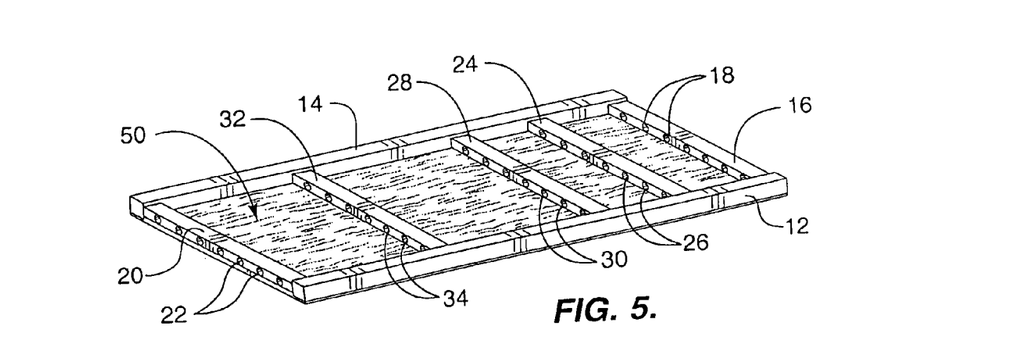
Figure 6:
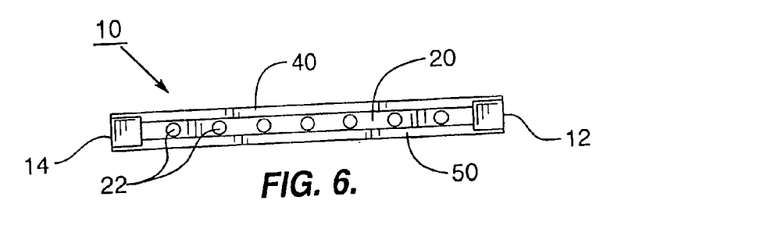
FIG. 6 is an end view of a door of the present invention.

The door 10 and a method of making the door is illustrated in FIGS. 3, 4, and 5. FIGS. 3, 4, and 5 are consecutive or sequential perspective views illustrating the steps used to make the door 10. FIG. 5 also illustrates the internal bracing of the door 10. FIG. 6 is an end view of the completed door 10. For the following discussion, reference will be primarily directed to FIGS. 3, 4, 5, and 6.

A central portion 52 of an outer door panel or skin 50 may be rough sanded by a belt sander 2 after parallel rabbets 54 and 56 are machined into the panel 50. Obviously, an automatic sanding machine, not shown, may be preferable to the hand operated belt sander 2 shown in FIG. 3 if such sanding is deemed desirable. The purpose of the sanding is to acquire better adhesion of the absorbent material to the panels of the door. Other methods may also be used, such as paint or other adhesive.

The stiles 12 and 14 extend into the rabbets 54 and 56, as best shown in FIG. 6, when the outer panels are ready to be secured to the perimeter frame and to any internal frame elements.

After the rough sanding or sealing of the panel, an absorbent, such as diatomaceous earth, is applied to the rough sanded portion 52 of the panel 50. In FIG. 4, the absorbent material is schematically represented by reference numeral 60 being applied from a can or cup 4 or other desired element.

It will also be noted that paper impregnated with an absorbent material 60 may also be adhesively secured to the panel portion 52. Paper strips are sometimes adhesively secured to the inside portions of the outer panels or skins to provide stiffness. The strips may be impregnated with an absorbent, as noted.

The layer 60 is a special absorbent material which also may include an appropriate binder to secure the adhesion of the absorbent material to the panel 50. A water based paint may be used if desired. A scraper or trowel 6 is shown in FIG. 4 as smoothing the layer of absorbent material 60 on the panel 50 to insure an even coating on the panel.

It will be noted that any appropriate method of applying the absorbent material may be used. For example, rollering, spraying, troweling, etc., may be desired under various circumstances, such as automating the process, and the type of absorbent material used, etc.

Absorbent materials, such as diatomaceous earth and other materials which may also contribute to the absorption and decomposition of formaldehyde and other noxious material in the air may be included in the material 60. A benefit of using diatomaceous earth, in addition to its absorbent capability, is the destruction of noxious insects. It is well known that insects which eat diatomaceous earth die of dehydration. Thus, the material 60 provides a pest control service, in addition to the absorption and decomposition of formaldehyde gases and tobacco smoke ingredients, and other noxious gases.

Other materials such as gypsum, sodium sulfate, manganese dioxide, aluminum oxide, titanium dioxide, potassium permanganate, tourmaline, various types of carbon or charcoal, and other materials currently being used or being developed, may also be included or used as or in the absorbent layer 60.

Furthermore, the use of nano scale materials may also be used to scrub noxious materials, such as volatile organic chemicals (VOCs), from air. Nano scale materials, such as the tourmaline referred to in the preceding paragraph, are being developed for scrubbing noxious materials from air, but at the present time the use of such technology is in it infancy. In the future, such materials may be advantageous for use with the structure set forth herein.

The steps illustrated in FIGS. 3 and 4 are accomplished on the inner surfaces of both panels 40 and 50. Sequentially, after both panels have received the absorbent or scrubber material, the panels are secured to the perimeter frame and to the internal bracing or core. For example, in FIG. 5 the bottom panel 50 is shown secured to the stiles 12 and 14 and to the rails 16 and 20. Both rails 16 and 20 include the holes or apertures 18 and 22, respectively. Internal horizontal bracing or core elements 24, 28, and 32 are secured to the panel 50 and to the stiles 12 and 14. The elements 24, 28, and 32 each have a plurality of holes or apertures 26, 30, and 34, respectively, to allow for the flow or air continuing through the core of the door 10.

FIG. 6, an end view of the door 10, shows the stiles 12 and 14 and the bottom rail 20 with is apertures 22, and the panels 40 and 50. Note that the panels 40 and 50 have been arbitrarily been designated "top" and "bottom" for convenience. The "top" panel 40 is also designated as the "front" panel, above.

The steps illustrated in FIGS. 3 and 4 are repeated for the top panel 40, and the panel 40 is then secured to the perimeter frame and to the core elements.

Figure 7:
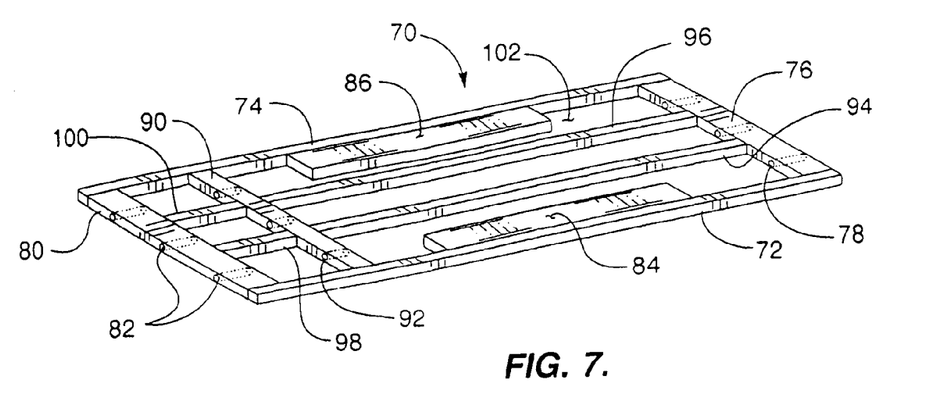
FIGS. 7 and 8 are perspective views of alternate embodiments of a portion of a door of the present invention illustrating cores.

FIG. 7 is a perspective view of a portion of an alternate embodiment of the present invention, comprising hollow core door 70. The door 70 includes a pair of spaced apart stiles 72 and 74 and a pair of rails 76 and 80 secured to the stiles.

The rail 76 is a top rail, and it includes a plurality of spaced apart holes 78 through which air flows. The rail 80 is a bottom rail, and it includes a plurality of spaced apart holes 82 through which air flows.

A lower horizontal cross brace 90 is spaced apart upwardly from the rail 80. The cross brace 90 includes a plurality of holes or openings 92 through which air flows. The holes 82, 92, and 78 are preferably aligned with each other to facilitate the air flow. However, the holes need not be aligned. Air will flow through the core of the door 70 generally regardless of the orientation or alignment of the various holes in the horizontally extending elements.

A pair of lock blocks 84 and 86 are secured respectively to the stiles 72 and 74. The pair of lock blocks 84 and 86 insure that the door 70 may be hung for either right handed or left handed movement.

Note that lock blocks, secured to the stiles, are not shown in most of the figures of the drawing herein. Such lock blocks are well known and understood in the door industry and have been omitted for convenience and clarity of illustration.

A pair of vertically extending brace elements 94 and 96 extend between the horizontal brace 90 and the top rail 76 and are appropriately secured thereto. Since the vertical elements 94 and 96 do not interfere with the flow of air through the core of the door 70, no holes need be drilled through them.

A panel 102 is appropriately secured to the stiles, the rails, the internal brace elements, and the lock blocks.

Figure 8:
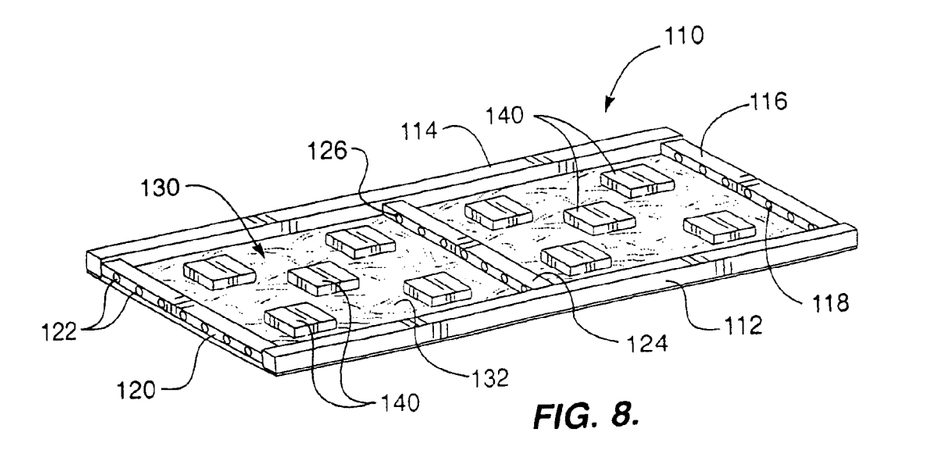

FIG. 8 is a perspective view of another alternate embodiment of a portion of a door 110 of the present invention.

The door 110 includes a pair of stiles 112 and 114 and a pair of rails 116 and 120. The top rail 116 includes a plurality of spaced apart holes 118 through which air flows. The bottom rail 120 includes a plurality of spaced apart holes 122. The stiles and rails are appropriately secured together, as are the stiles and rails in the previously discussed embodiments.

Within the door frame of the stiles and rails is a horizontal brace 124. The brace 124 includes a plurality of holes or openings 126. A bottom panel 130 is appropriately secured to the frame elements, including the stiles, the rails, and the brace 124. An absorbent layer 132 is in turn secured to the panel 130.

Secured to the panel 130 are spacer blocks 140. The blocks 140 are disposed both above and below the horizontal brace 124. The blocks 140 are spaced apart so as not to impede the flow of air through the core of the door 110. A top panel, not shown, is in turn secured to the blocks and to the frame members 112, 114, 116, 120, and 124, and to the internal brace blocks 140. The internal blocks and the brace element 124 provide internal strength for the door. Note that lock blocks are not shown for the door 110. Such blocks are, of course, required.

Figure 9:
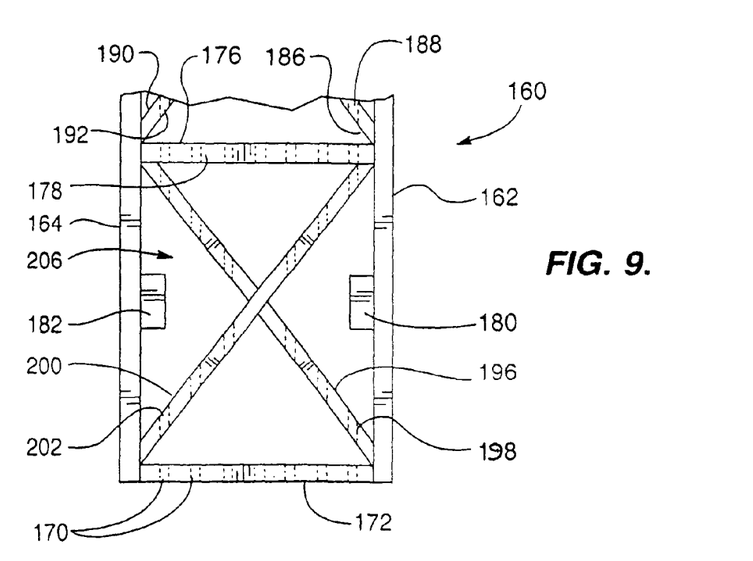
FIGS. 9 and 10 are plan views of more alternate embodiments of a portion of a door or the present invention illustrating core elements.

FIG. 9 is a partial plan view of a hollow core door 160, which is another alternate embodiment of the present invention. The door 160 includes a pair of stiles 162 and 164, and a pair of rails of which only a bottom rail 170 is shown. The rail 170 includes a plurality of holes 172 extending through the rail for the flow of air within the door 160.

The internal bracing for the door 160 includes a horizontal brace 176 extending between and secured to the stiles 162 and 164. The brace 176 includes a plurality of holes 178 through which the air flows.

The internal bracing also includes two pair of x members, an upper pair 186 and 190, and a lower pair 196 and 200. The member 186 includes a plurality of holes 188 and the member 190 includes a plurality of holes or openings 192. The lower members 196 and 200 include holes 198 and 202, respectively. Thus, air flows through the holes 172 in the rail 170, through the holes 198 and 202 in the x members 196 and 200, respectively, through the holes 178 in the horizontal brace 176, through the holes 188 and 192 in the upper x members 186 and 190, respectively, and through holes in the upper rail, not shown.

Secured to the frame of the door 160 is a bottom panel 206. An appropriate absorbent material, such as diatomaceous earth in an appropriate binder, is secured to the panel 206 and to a top panel, not shown. As the air flows through the hollow core of the door 160, through the various holes, past the absorbent material on both the bottom panel 206 and the top panel, formaldehyde compounds and other noxious gases or materials are filtered out.

Figure 10:
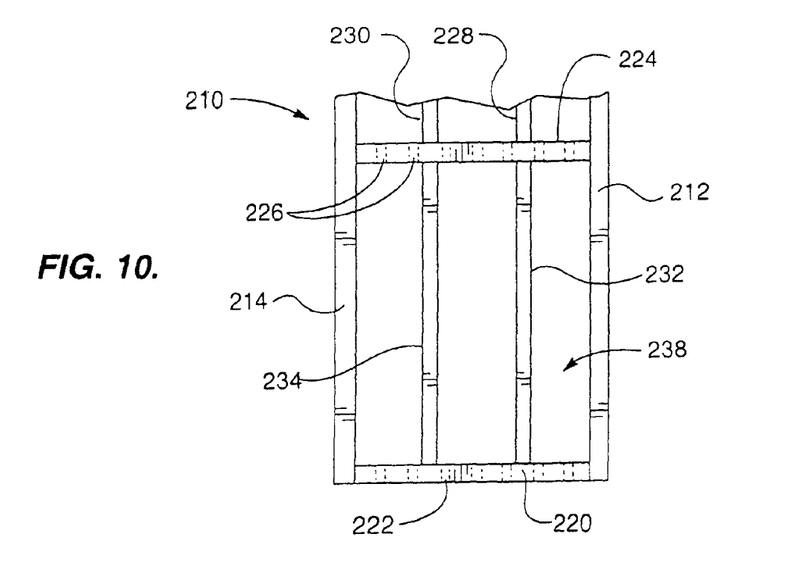

FIG. 10 is a plan view, partially broken away, of another alternate embodiment of a frame and core structure of a door 210. The door 210 includes a pair of stiles 212 and 214 and a pair of rails, of which only a lower rail 220 is shown. The rail 220 includes a plurality of holes or openings 222 extending through the rail for the flow of air. The stiles 212 and 214 and the rails are appropriately secured together and define the perimeter frame for the door 210.

A horizontal brace 224 extends between and is secured to the stiles 212 and 214. A plurality of holes 226 extend through the brace 224 for the flow of air. Above the brace 224 are a pair of vertically extending braces 228 and 230. The braces 228 and 230 extend between and are secured to the upper rail, not shown, and the brace 224. A similar pair of vertically extending braces 232 and 234 extend between and are secured to the bottom rail 220 and the horizontal brace 224.

A bottom panel 238 is secured to the various members, including the perimeter frame 212, 214, 220 and the upper rail, not shown, and to the internal brace or core elements, including the horizontal brace 224 and the vertical elements 228, 230, 232, and 234. The panel includes an appropriate absorbent material secured thereto. An upper panel, not shown, completes the door 210, along with appropriate lock blocks, also not shown.

Figure 11:
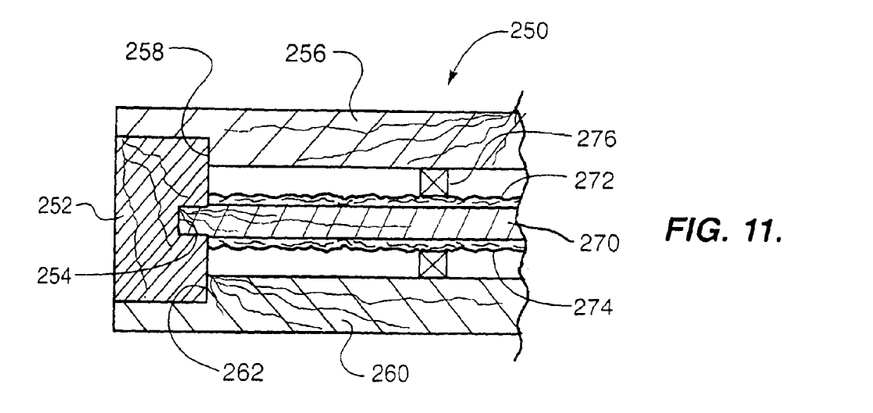
FIG. 11 is a view in partial section of a portion of another alternate embodiment of the present invention.

FIG. 11 is a view in partial section of a portion of a door 250 which includes a full length inner panel 270 with absorbent coatings 272 an 274 on both sides. The panel 270 comprises a single core element. The door 250 includes a stile 252 with a dado groove 254 which receives the panel 270. The door 250 also includes two outer panels 256 and 260. The panels 256 and 260 includes rabbets 258 and 262 into which the stile 252 extends.

A pair of spacers 276 help to center the panel 270 between the outer door panels 256 and 260. The spacers 276 are aligned with each other for proper support, and additional pairs (not shown) are spaced apart as appropriate between stiles.

It will be noted that the inside of the panels 256 and 260 may also be coated, as discussed above for the doors 10, 70, 110, 160, and 210. Using four such surfaces for the absorbent material provides nearly seventy five square feet of absorption area.

The panels 256 and 260 may be mdf or other appropriate material, as desired.

Figure 12:
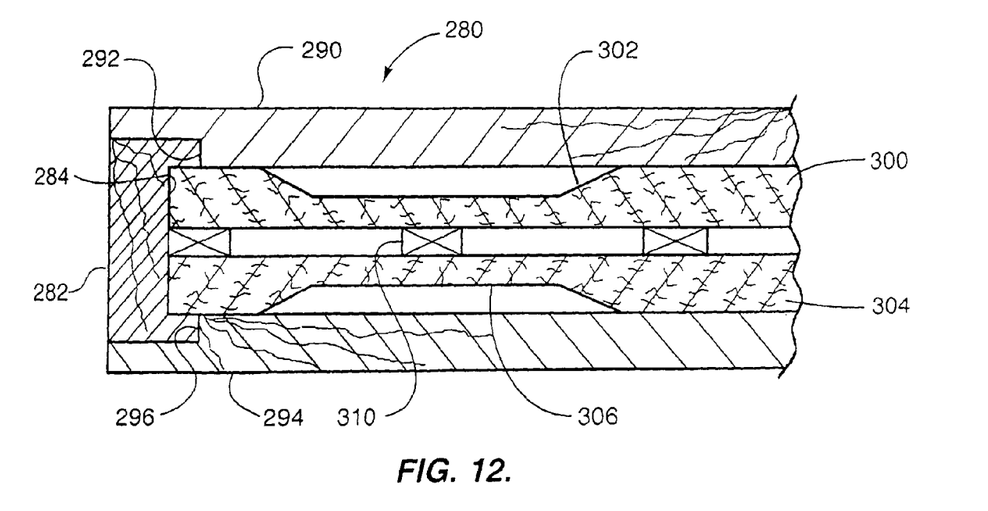
FIG. 12 is a view in partial section of a portion of another alternate embodiment of the present invention.

FIG. 12 is a view in partial section of a portion of a door 280 which includes two outer panels 290 and 294 and two absorbent inner panels 300 and 304 as part of the core elements. The door 280 includes a stile 282 which extends into rabbets 292 and 296 in the outer panels 290 and 294, respectively, and a relatively large dado groove 284 into which extends the panels 300 and 304. A plurality of spacers 310 hold the panels 300 and 304 apart within the door 280. The spacers 310 are spaced apart between stiles as needed for supporting and spacing the panels 300 and 304. Note that the first spacer 310 extends into the dado groove 284 between the outer ends of the panels 300 and 304.

The panel 300 includes a recess 302 and the panel 304 includes a recess 306. The recesses 302 and 306 increase the surface of the panels 300 and 304, respectively for absorption purposes.

The panels 300 and 304 may be gypsum, without the paper or cardboard covers which wall board (gypsum board) has, and that have had materials discussed above added to them for scrubbing. The panels 300 and 304 may also be a pair of panels such as the panel 270 of FIG. 11. However, gypsum has qualities which lend credence to its use as singular panels.

A special quality of gypsum, in addition to is general absorbency capabilities, is that is absorbs moisture from the air when there is high humidity and releases the moisture when the humidity is low. The use of gypsum accordingly decreases mildew and mold growth in a structure, in addition to increasing the comfort level in the structure.

Another property or quality of gypsum is that it helps to absorb sound. Thus, the use of a door 280 with a pair of gypsum panels reduces the sound level in a structure in which such a door or doors is/are installed.

Another property or quality of gypsum is its fire retardant ability. The doors with the gypsum panels thus provide fire protection within a structure not otherwise contemplated by prior art hollow core doors.

As an alternative to two gypsum panels within a door, a single gypsum panel, such as the panel 300, may be paired with a panel such as the coated panel 270 of the door 250. Such door combination provides a mixture of the capabilities or qualities or advantages of the various absorbents.

Note that the panels 270, 300, and 304 comprise core bracing elements in addition to their absorption functions. The spacer elements used in conjunction with the inner panels also contribute to core bracing for their doors.

Referring again primarily to FIGS. 2, 5, and 6, the top and bottom rails show openings or holes 18 and 22, respectively. If only formaldehyde gases or other noxious materials within an mdf door or the like were considered, such openings or holes in the rails may be eliminated. With absorbent material, such as diatomaceous earth, within the core, the formaldehyde products would be absorbed and decomposed. Holes or openings may still be located within internal bracing elements, if desired. However, the internal bracing elements may also be without holes if the internal absorbent is located similarly to that shown in FIG. 5. Obviously, the location and quantity of the absorbent material will be as appropriate for a particular door.

Moreover, if absorbent and decomposing materials, such as diatomaceous earth and gypsum, etc., are incorporated into the construction of the mdf or similar material, then such materials need not be added to the inside of the panels themselves. Rather, the addition of the scrubbing materials to the mdf or similar material in the making of the panels simplifies the scrubbing situation.

However, the inclusion of the scrubbing materials into the panels is may not be sufficient if the filtering or scrubbing of an air flow through a hollow core door is desired. In such case, the addition of scrubbing material or materials within the hollow core as described above is desirable.

While diatomaceous earth and other materials have been mentioned or discussed above as appropriate absorbent materials for formaldehyde and other noxious material in the gases in the air flowing through the hollow core of a door, there are other appropriate absorbent or decomposing materials, such as activated carbon or charcoal, with appropriate additives, and other materials which also may be used for absorbing and decomposing formaldehyde and other noxious gases in the air flowing through the internal core of the hollow doors discussed above. And in the future there will undoubtedly be other materials to perform the same basic scrubbing functions.

Moreover, one panel, a top panel for example, may use one type of absorbent or decomposing material, while the other panel, a bottom panel, may use another type of absorbent or decomposing material. Or several types of such materials may be used on each panel. The use of a particular one or more materials may depend on the particular situations or locations for or at which the doors are made or are installed. The removal of noxious materials from air flowing through the hollow core of a door may include different types of absorbent or decomposing or other products. Noxious material may take the form of compounds, odors, moisture, etc., and combinations of such things.

The removal of such noxious material may require absorption, decomposition, or other technique—chemical, mechanical, etc. The flow of air in a structure and through the hollow core of a door carries the noxious material, and the removal of the noxious material may require a combination of products, techniques, etc.

Another technique may also be used to remove noxious materials, and that technique is to use a photocatalyst, such as titanium dioxide. A photocatalyst, such as titanium dioxide reacts to light, such as ultra violet light, and breaks down into hydroxyl radicals and super oxide anions. The products of the photocatalytic process oxidize noxious materials, such volatile organic compounds, formaldehyde, and other materials as referred to above, etc.

Ambient light, direct sunlight, or an artificial light source, may be used to provide the necessary light to catalyze the photocatalytic material. The photocatalytic process will continue as long as there is light to cause the photocatalytic to take place.

Accordingly, referring to FIG. 1, the exterior of the door, or the door facings, may be coated with titanium dioxide or other photocatalytic compound. In the presence of light, sunlight or ambient light, the photocatalytic process takes place, removing noxious products.

Figure 13:
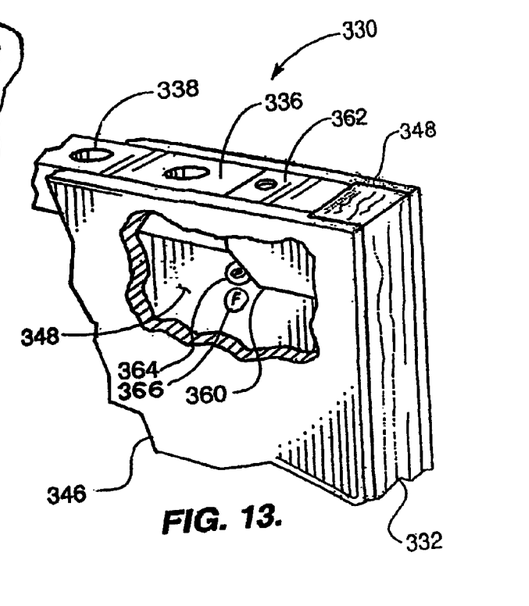
FIG. 13 is a fragmentary view of a portion of a door comprising another alternate embodiment of the present invention.

Referring to FIG. 13, if such photocatalytic coating is placed on the inside of hollow core doors, an artificial light source must be provided in order to cause the photocatalytic process to take place.

FIG. 13 is a schematic representation of a portion of a hollow core door 330 having an artificial light source and associated elements. The door 330 includes a stile 332 and a top rail 336. Extending through the rail 336 are shown two holes or apertures 338 through which air flows from the interior of the door 330. The door 330 also includes a top panel 346 and a rear or back panel 348.

Extending downwardly from the rail 336 is a battery and lamp compartment 360. The compartment 360 includes a top cover 362. Extending outwardly from the compartment 360 is a lamp 364. Replacement of the battery or batteries for providing current for the lamp 364 is by way of the cover 362. The cover 362 is flush with, or slightly recessed below, the top of the rail 336.

Within the door 330, either on the inside of the panels 346 and 348 is photocatalytic material, and the lamp 364 provides the appropriate light, such as uv light, to initiate the photocatalytic process. If desired, there may be additional light sources secured within the hollow core, in compartments such as 360, and attached to the rails or stiles, as appropriate or as desired.

If the airflow through the door 330 by normal convective processes is deemed insufficient, a relatively small fan may be incorporated into the door. Referring again to FIG. 13, a fan 366 may be substituted for the lamp 364 for moving the air. In such case, the fan 366 may be disposed at the top of the door 330, as shown, or it may be disposed at the bottom of the door to achieve the air flow.

It will be noted that the term "gases" is to be broadly construed and includes water vapor or moisture in the air, as well as odoriferous gases, and other noxious materials or compounds in the air within a structure. The term "gases" is thus not limited to formaldehyde or similar gases.

It will also be noted that doors made out of mdf products have been discussed and illustrated because of the use of formaldehyde resin or binders commonly used in the manufacture of mdf products, and formaldehyde is probably the leading noxious material. However, a hollow core door made of steel, fiberglass, wood, or other products, may also be used with absorbent, decomposing, etc., material within the hollow core for removing or neutralizing noxious material or products or gases from air flowing through the hollow core. The scrubbing of noxious material from air flow accordingly may require a combination of materials secured within the hollow core of a door regardless of what the door is made of.

The terms "scrubber," "scrubbers," and "scrubbing," all refer generically to the various kinds or types of material which may be used to remove noxious materials from the internal air flow within the core of a door.

It will further be noted that as used herein, and in the following claims, the terms "material" and "materials" are virtually interchangeable, with "material" being considered both, or either, singular or plural.

The terms "absorb" and "absorbent," etc., have been used herein regarding appropriate materials for carrying out the purposes of the present invention. It will be understood that "adsorb" and "adsorbent" materials may also be used to carry out the purposes of the present invention. Essentially, for purposes herein, the terms are interchangeable. Moreover, it will be understood that a combination of absorbent and adsorbent materials may be used if desired in the cleaning or filtering of the air flow through the hollow core doors of the present invention.

It will be still further noted that openings may be provided in the top and bottom structural elements of a door, and in structural or other elements within the door without regard to the material out of which the door is made. The terms "rails" and "stiles" refer broadly and respectively to the top and bottom horizontal and to side vertical elements of a door perimeter frame without regard to the material out of which the door is made.

Moreover, the size of the openings or holes in the rails and in the internal core elements may vary from relatively small to rather large, depending on the desired air flow and on the absorption material within the core of the door.

Finally, it will be understood that airflow through a door may vary, depending on the time of day, the relative humidity, the size of the openings in the rails and in other interior door elements, and other factors. For example, morning air it typically more humid, and the more humid air flowing through a door core may be more readily absorbed into the filtering materials than drier air. As the relative humidity decreases during the day, the drier air minus the contaminants or noxious materials is desorbed from the filtering material and flows out of the door. Contaminants, or noxious material, in the airflow through the door may still be removed from the airflow regardless of the relative humidity of the air. Furthermore, humidity itself may be absorbed by various materials.

The changes in the humidity during the day perhaps allow the removal process to be more efficient. However, air flowing through the door will be cleansed by the scrubbing material disposed within the core of the door by normal convection regardless of the humidity. The flowing air is cleansed of contaminants and noxious material from both the room and the door core internal elements, as stated above.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. A hollow core door for removing noxious material from air flowing within the door and having a top and a bottom comprising in combination:
    a pair of spaced apart stiles;
    a pair of spaced apart rails having a plurality of openings through which air flows within the door between the top and bottom of the door, and the rails are secured to the pair of spaced apart stiles and define with the stiles a perimeter frame;
    a top panel element and a bottom panel element secured to the perimeter frame; and
    means for removing noxious material from the air flowing within the door through the top and bottom rails to help clean the flowing air.

2. The door of claim 1 which further includes internal elements secured to the perimeter frame and between the top and bottom panel elements.

3. The door of claim 2 in which the internal elements include at least a single horizontal frame element secured to the pair of stiles and having means for allowing a flow of air through the horizontal frame element to continue the flow of air through the top and bottom rails.

4. The door of claim 3 in which the internal elements include at least a pair of x frame members extending between the horizontal frame element and a rail, and the x frame members include openings through which the air flows.

5. The door of claim 3 in which the internal elements include a pair of upper x members and a pair of lower x members extending respectively between the horizontal frame element and the upper and lower rails, and the x members include openings for the flow of air.

6. The door of claim 2 in which the internal elements include vertical elements.

7. The door of claim 2 which further includes a plurality of spaced apart blocks secured to at least one of the top and bottom panel elements for providing internal strength to the door.

8. The door of claim 1 in which the means for removing noxious material includes an absorbent secured to the top and bottom panel elements and past which the air flows through the top and bottom rails.

9. The door of claim 1 in which the door further includes a first inner panel disposed between the top and bottom panel elements, and the means for removing noxious material is secured to the first inner panel.

10. The door of claim 9 in which the means for removing noxious material includes a second inner panel disposed between the top and bottom panel elements and spaced apart from the first inner panel.

11. The door of claim 1 in which the means for removing noxious material includes diatomaceous earth.

12. The door of claim 1 in which the means for removing noxious material includes gypsum.

13. The door of claim 1 in which the means for removing noxious material from the air includes photocatalytic material and a light source to catalyze the photocatalytic material.

14. The door of claim 1 in which the means for removing noxious material from the air includes a fan for moving air through the door.

15. A hollow core door for removing noxious material from air in a room in which the door is installed comprising in combination:
    a pair of spaced apart stiles;
    a pair of spaced apart rails secured to the pair of spaced apart rails, the stiles and the rails defining a perimeter frame;
    a plurality of openings in the spaced apart rails through which air flows vertically within the door;
    a first panel secured to the perimeter frame;
    first means secured to the first panel to absorb the noxious material to help clean the air; and
    a second panel secured to the stiles and rails oppositely to the first panel.

16. The door of claim 15 in which the second panel includes absorbent material to absorb the noxious material.

17. The door of claim 15 which further includes at least a single internal element secured to the perimeter frame.

18. The door of claim 17 which further includes openings in the internal element through which air having noxious material therein flows.

19. The door of claim 18 which further includes second means for removing the noxious material from the flow of air.

20. A method of making a hollow core door for removing noxious material from a flow of air comprising the steps of:
    providing a perimeter frame including a pair of stiles and a pair of rails;
    providing openings through the pair of rails for the flow of air within the door;
    providing a top panel and a bottom panel each having an inside and an outside surface;
    providing means for removing noxious material from the flow of air through the openings in the pair of rails to help clean the air;
    securing one of the panels to the stiles and rails; and
    securing the other of the panels to the stiles and rails oppositely from the one of the panels.

21. The method of claim 20 in which the means for removing noxious material from the flow of air comprises the step of providing absorbent material on the inside of a least one of the top and bottom panels for absorbing the noxious material.

22. The method of claim 21 which includes the further step of providing at least a single internal element within the perimeter frame between the top and bottom rails.

\* \* \* \* \*